(12) United States Patent
Lin et al.

(10) Patent No.: US 12,716,144 B2
(45) Date of Patent: Aug. 25, 2026

(54) ULTRATHIN COPPER FOIL, A METHOD FOR MANUFACTURING THE SAME, AND AN ARTICLE MADE THEREFROM

(71) Applicant: DUPONT ELECTRONICS, INC., Wilmington, DE (US)

(72) Inventors: Shih-Ching Lin, Hsinchu (TW); Ya-Mei Lin, Hsinchu (TW)

(73) Assignee: DUPONT ELECTRONICS, INC., Wilmington, DE (US)

( * ) Notice: Subject to any disclaimer, the term of this patent is extended or adjusted under 35 U.S.C. 154(b) by 0 days.

(21) Appl. No.: 18/592,717

(22) Filed: Mar. 1, 2024

(65) Prior Publication Data

US 2024/0417877 A1 Dec. 19, 2024

Related U.S. Application Data

(60) Provisional application No. 63/487,960, filed on Mar. 2, 2023.

(51) Int. Cl.

| | |
|---|---|
| ***C25D 5/48*** | (2006.01) |
| ***C25D 3/38*** | (2006.01) |
| ***C25D 5/04*** | (2006.01) |
| ***H01M 4/66*** | (2006.01) |

(52) U.S. Cl.
CPC ................. *C25D 5/48* (2013.01); *C25D 3/38* (2013.01); *C25D 5/04* (2013.01); *H01M 4/661* (2013.01)

(58) Field of Classification Search
None
See application file for complete search history.

(56) References Cited

U.S. PATENT DOCUMENTS

| | | | | |
|---|---|---|---|---|
| 5,861,076 | A | 1/1999 | Adlam et al. | |
| 8,815,387 | B2 | 8/2014 | Sato et al. | |
| 9,397,343 | B1 * | 7/2016 | Cheng | C25D 3/38 |
| 9,688,704 | B2 | 6/2017 | Miura et al. | |
| 10,385,076 | B2 | 8/2019 | Mori et al. | |
| 2014/0342178 | A1 * | 11/2014 | Saito | C25D 1/04 428/606 |
| 2016/0260981 | A1 * | 9/2016 | Lee | H01M 4/661 |
| 2017/0141403 | A1 * | 5/2017 | Song | H01G 11/70 |
| 2018/0288884 | A1 | 10/2018 | Ori et al. | |
| 2019/0013212 | A1 | 1/2019 | Matsuura | |
| 2021/0317590 | A1 * | 10/2021 | Oguro | C25D 1/04 |
| 2022/0127743 | A1 | 4/2022 | Kaidi et al. | |
| 2024/0097139 | A1 * | 3/2024 | Moon | H01M 4/661 |

* cited by examiner

*Primary Examiner* — Seth Dumbris

(57) ABSTRACT

The present invention discloses an ultrathin copper foil without a carrier, that has an area weight of about 45 $g/m^2$ or less; a nominal thickness of about 5.0 μm or less; a tensile strength of about 40 $Kgf/mm^2$ or more; and a loop stiffness of 2 mN or more. Also disclosed are methods for manufacturing the present ultrathin copper foils, surface-treated ultrathin copper foils and articles made therefrom.

9 Claims, 1 Drawing Sheet

ULTRATHIN COPPER FOIL, A METHOD FOR MANUFACTURING THE SAME, AND AN ARTICLE MADE THEREFROM

FIELD OF THE INVENTION

The present invention relates to an ultrathin copper foil without a carrier, wherein the ultrathin copper foil has an area weight of about 45 $g/m^2$ or less, and a nominal thickness of about 5.0 μm or less. The present invention also relates to a method for manufacturing the ultrathin copper foil, a surface-treated ultrathin copper foil and an article made therefrom.

BACKGROUND OF THE INVENTION

Due to the current trend towards thinner and lighter electronic products and printed circuit boards with a higher wiring density, the copper foils for forming the circuits on a multilayer printed circuit board (PCB) must also become thinner. As a copper foil suitable for a PCB manufacturing process, the copper foil usually has been surface-treated by subjecting the raw copper foil to a series of surface treatment steps to impart favorable/desired properties.

The conventional surface treatment process of a copper foil is shown in FIG. 1, which involves multiple steps include pickling in a tank 11, roughening by forming copper nodules in a plating bath 12, forming a heat-resistant layer in a plating bath 13, forming an antioxidant layer in a plating bath 14, coating with an adhesion promoter in a treatment chamber 15, and drying in an oven 16. Generally, the last surface treatment step before drying is to form an adhesion-promotion layer by treating with a known adhesion promotor such as a silane-based compound, and the like.

During the surface treatment process, the copper foil will be subjected to various stresses and tensions during passing through dozens of transport rollers and high current electroplating, and high temperature conditions. Therefore, the copper foil must have sufficient mechanical strength and stiffness to withstand the surface treatment process. As the nominal thickness of a copper foil reduced, the mechanical strength of a copper foil is likely reduced. It's known that a copper foil must have a nominal thickness of more than 5.0 μm to withstand the tensile strain and various stresses during the surface treatment process and thereafter can be used for manufacturing printed circuit boards.

When the nominal thickness of a copper foil is less than 5.0 μm, it is generally characterized as an ultrathin copper foil in the copper foil industry. However, due to the insufficient mechanical strength, the ultrathin copper foils may crease an/or break easily when encountering various stresses and tensions generated by the conventional surface treatment process. Consequently, it's difficult to manufacture surface-treated ultrathin copper foils without modifying the surface treatment process parameters and/or even the process equipment/tool.

Further, due to insufficient strength and stiffness, the surface-treated ultrathin copper foils cannot be present in a freestanding form without wrinkling and/or sagging. Consequently, it also creates handling and processing difficulties for the PCB manufacturers who wish to make thinner PCBs by incorporating the ultrathin copper foils.

To solve the aforementioned problems, current commercially available ultrathin copper foil generally constitutes a carrier to impart sufficient tolerance for the ultrathin copper foil to withstand the conventional surface treatment process.

The surface-treated ultrathin copper foil with a carrier can then be used in manufacturing a thinner multilayer printed circuit board.

Common carrier for an ultrathin copper foil includes copper foils, aluminum foils, metal foils, or plastic films, etc. For references on ultrathin copper foil with a carrier, please see US Patent Publication No. US20220127743 A1, US20190013212 A1 and US20180288884 A1.

One obvious drawback of the ultrathin copper foil with a carrier is that the carrier must be removed during the PCB manufacturing process. This extra carrier removal step not only increases the labor, cost, and work burden but also generates more industrial waste. It is not helpful for the PCB manufacturers that wish to achieve energy saving, carbon reduction, and environment load reduction.

In view of the above, there exists a need to develop an ultrathin copper foil without a carrier and can be surface-treated with a conventional surface treatment process to bring overall benefits to the printed circuit board industry.

SUMMARY OF THE INVENTION

To solve the aforementioned problems, the present invention provides an ultrathin copper foil without a carrier having sufficient strength and stiffness, a method for manufacturing said ultrathin copper foil.

According to one aspect of the present invention, an ultrathin copper foil without a carrier is provided. The ultrathin copper foil has an area weight of about 45 $g/m^2$ or less, a nominal thickness of about 5.0 μm or less, a tensile strength at of about 40 $Kgf/mm^2$ or more, and a loop stiffness of 2 mN or more.

According to the second aspect of the present invention, a method for manufacturing the above-mentioned ultrathin copper foil is provided. The method comprises:

i) providing an electrolytic solution in an electrolytic cell;

ii) applying an electric current at a current density to a positive electrode plate and a rotating negative electrode drum that are spaced apart from each other in the electrolytic solution;

iii) electrodepositing a copper foil on the rotating negative electrode drum; and iv) separating the obtained copper foil from step iii); wherein, the electrolytic solution comprises:

about 120 g/L to about 450 g/L of copper sulfate;

about 30 g/L to about 140 g/L of sulfuric acid;

about 0.01 ppm to about 25.0 ppm of chloride ion; and about 0.01 ppm to about 75 ppm of at least one additive.

According to the third aspect of the present invention, a surface-treated ultrathin copper foil without a carrier that is manufactured by subjecting the present ultrathin copper foil to a surface treatment process is also provided.

According to the fourth aspect of the present invention, an article made by use of the surface-treated ultrathin copper foil without a carrier of the present invention is provided.

In one embodiment, wherein the article is a negative current collector of a lithium-ion battery or electric double-layer capacitor, a copper clad laminate, a rigid printed circuit board, a flexible printed circuit board, a rigid-flex printed circuit board, or a resin coated copper (RCC).

DETAILED DESCRIPTION OF THE EMBODIMENTS

Figure 1:
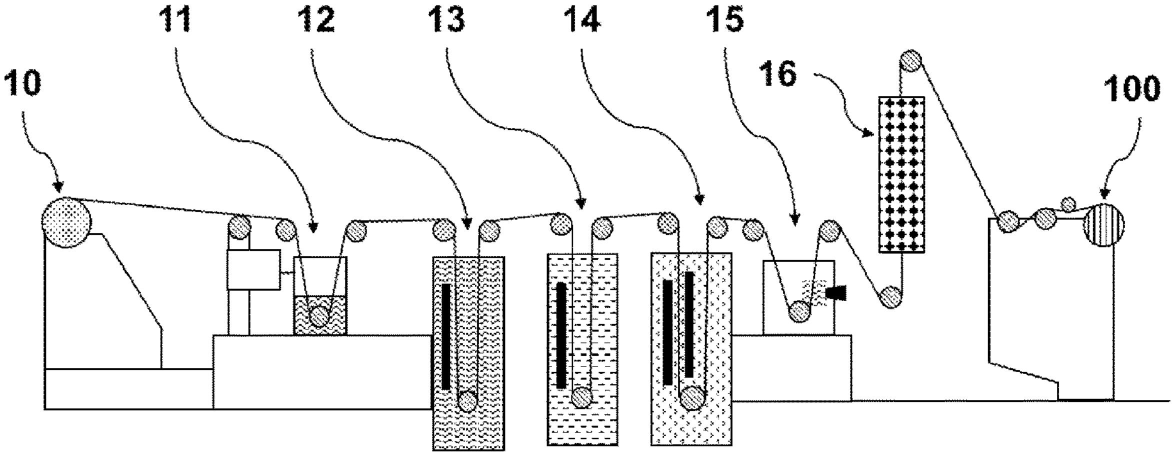
FIG. 1 illustrates a conventional surface treatment process of copper foil.

All publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this invention belongs. In case of conflict, the present specification, including definitions, will control.

Unless stated otherwise, all percentages, parts, ratios, etc., are by weight. As used herein, the term "produced from" is synonymous to "comprising". As used herein, the terms "comprises," "comprising," "includes," "including," "has," "having," "contains" or "containing," or any other variation thereof, are intended to cover a non-exclusive inclusion. For example, a composition, process, method, article, or apparatus that comprises a list of elements is not necessarily limited to only those elements but may include other elements not expressly listed or inherent to such composition, process, method, article, or apparatus.

The transitional phrase "consisting of" excludes any element, step, or ingredient not specified. If in the claim, such a phrase would close the claim to the inclusion of materials other than those recited except for impurities ordinarily associated therewith. When the phrase "consisting of" appears in a clause of the body of a claim, rather than immediately following the preamble, it limits only the element set forth in that clause; other elements are not excluded from the claim as a whole.

The transitional phrase "consisting essentially of" is used to define a composition, method or apparatus that includes materials, steps, features, components, or elements, in addition to those literally discussed, provided that these additional materials, steps features, components, or elements do not materially affect the basic and novel characteristic(s) of the claimed invention. The term "consisting essentially of" occupies a middle ground between "comprising" and "consisting of".

The term "comprising" is intended to include embodiments encompassed by the terms "consisting essentially of" and "consisting of". Similarly, the term "consisting essentially of" is intended to include embodiments encompassed by the term "consisting of".

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. For example, when a range of "1 to 5" is recited, the recited range should be construed as including ranges "1 to 4", "1 to 3", "1-2", "1-2 & 4-5", "1-3 & 5", and the like. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

Further, unless expressly stated to the contrary, "or" refers to an inclusive "or" and not to an exclusive "or". For example, a condition A "or" B is satisfied by any one of the following: A is true (or present) and B is false (or not present), A is false (or not present) and B is true (or present), and both A and B are true (or present).

As used herein, the term "hydrocarbon group" refers to an organic compound having at least one carbon atom and at least one hydrogen atom, optionally substituted with one or more substituents where indicated. "Alkyl group" refers to a straight or branched chain saturated hydrocarbon having the specified number of carbon atoms and having a valence of one, such as methyl, ethyl, n-propyl, i-propyl, or the different butyl. "Alkylene group" refers to an alkyl group having a valence of two. "Cycloalkyl group" refers to a monovalent group having one or more saturated rings in which all ring members are carbon, such as cyclopropyl, cyclobutyl, cyclopentyl and cyclohexyl; "cycloalkylene group" refers to a cycloalkyl group having a valence of two. "Aryl group" refers to a monovalent aromatic monocyclic or polycyclic ring system where the ring member is constituted of carbon atoms and may include a group with an aromatic ring fused to at least one cycloalkyl or heterocycloalkyl ring, such as phenyl, biphenyl, triphenyl, naphthyl, and binaphthyl. "Arylene group" refers to an aryl group having a valence of two. The total number of carbon atoms in a substituent group is indicated by the "Ci-Cj" prefix.

The term "optionally substituted" is used interchangeably with the words "substituted or unsubstituted" or with the term "(un) substituted". The expression "optionally substituted with 1 to 4 substituents" means that no substituent is present (i.e., unsubstituted), or 1, 2, 3, or 4 substituents are present (limited by available bond positions). Unless otherwise indicated, an optionally substituted group can have one substituent at each substitutable position of the group, and each substituent is independent selected.

Embodiments of the invention as described in the Summary of the Invention include any other embodiments described herein, can be combined in any manner, and the descriptions of variables in the embodiments pertain not only to the composite laminate of the invention, but also to the articles made therefrom.

The invention is described in detail hereinunder.

The present invention relates to an ultrathin copper foil without a carrier. The present ultrathin copper foil has an area weight of about 45 $g/m^2$ or less, a nominal thickness of about 5.0 μm or less, a tensile strength of about 40 $Kgf/mm^2$ or more, and a loop stiffness of about 2 mN or more. Noted that the mechanical properties including tensile strength, percent elongation, and loop stiffness are measured at ambient temperature, i.e., about 20° C. to about 25° C.

In one embodiment of the present invention, the ultrathin copper foil without a carrier has an area weight of about 45 $g/m^2$ or less, or about 35 $g/m^2$ or less, or about 25 $g/m^2$ or less.

In one embodiment of the present invention, the ultrathin copper foil without a carrier has a nominal thickness of about 5.0 μm or less, or about 4.0 μm or less, or about 3.0 μm or less, or about 2.0 μm or less.

In one embodiment of the present invention, the ultrathin copper foil without a carrier has a tensile strength of about 40 $Kgf/mm^2$ or more, or about 50 $Kgf/mm^2$ or more, or about 60 $Kgf/mm^2$ or more, or about 70 $Kgf/mm^2$ or more.

In one embodiment of the present invention, the ultrathin copper foil without a carrier has a loop stiffness of about 2 mN or more, or 3 mN or more, 4 mN or more, 5 mN or more.

The second aspect of the present invention is to provide a method for manufacturing the above-mentioned ultrathin copper foil without a carrier, comprising:

i) providing an electrolytic solution in an electrolytic cell;

ii) applying an electric current at a current density to a positive electrode plate and a rotating negative electrode drum that are spaced apart from each other in the electrolytic solution;

iii) electrodepositing a copper foil on the rotating negative electrode drum; and iv) separating the copper foil obtained from step iii);

wherein, the ultrathin copper foil has an area weight of about 45 $g/m^2$ or less and a nominal thickness of about 5.0 μm or less;

the electrolytic solution comprises:

about 120 g/L to about 450 g/L of copper sulfate;

about 30 g/L to about 140 g/L of sulfuric acid;

about 0.01 ppm to about 25.0 ppm of chloride ion; and about 0.01 ppm to about 75 ppm of at least one additive.

In the manufacturing method of the present invention, the electrolytic solution comprises copper sulfate, sulfuric acid, chloride ion, and at least one additive. Both of copper sulfate, which is the source of copper ion, and sulfuric acid, which is the electrolyte, in the electrolytic solution are commercially available from a variety of sources and used without further purification.

In one embodiment of the present invention, the content of copper sulfate in the electrolytic solution, based on the total volume of the electrolytic solution, is about 120 g/L to about 450 g/L; or about 180 g/L to about 400 g/L; or about 240 g/L to about 350 g/L.

In one embodiment of the present invention, the content of sulfuric acid in the electrolytic solution, based on the total volume of the electrolytic solution, is about 30 g/L to about 140 g/L; or about 35 g/L to about 130 g/L; or about 40 g/L to about 120 g/L.

The source of the chloride ion may be copper chloride or hydrochloric acid. The source of chloride ion is commercially available and used without further purification.

In one embodiment of the present invention, the content of chloride ion in the electrolytic solution, based on the total weight of the electrolytic solution, is about 0.01 ppm to about 25.0 ppm, or about 0.05 ppm to about 20.0 ppm, or about 0.1 ppm to about 15.0 ppm, or about 0.5 ppm to about 10.0 ppm.

There is no specific limitation on the additives used in the present invention as long as the obtained ultrathin copper foil has high tensile strength and high loop stiffness. Additives suitable for use in the electrolytic solution include gelatin, animal glue, cellulose, a nitrogen-containing cationic polymer, or combinations thereof. Other additives, such as accelerators, inhibitors, or leveling agents may also be added in combination of one or more kinds depending on the situation.

In some embodiments of the present invention, the additive comprises gelatin, animal glue, cellulose, a nitrogen-containing cationic polymer, or combinations thereof.

In another embodiment of the present invention, the additive is a nitrogen-containing cationic polymer.

In another embodiment of the present invention, the nitrogen-containing cationic polymer is a product of the reaction of a diamine of formula (I) and an epoxide of formula (II) in about 1:1 molar ratio:

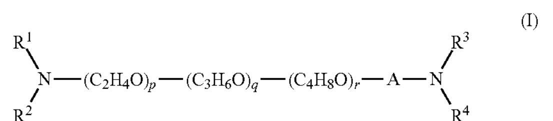

(I)

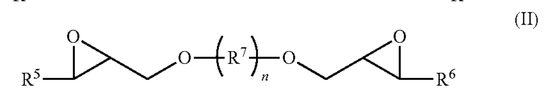

(II)

wherein, each of $R^1$, $R^2$, $R^3$, $R^4$, $R^5$ and $R^6$ is independently H or $C_1$-$C_5$ alkyl;

$R^7$ is a divalent linking group selected from $C_2$-$C_8$ alkylene and $C_5$-$C_{10}$ cycloalkylene, and $R^7$ is optionally substituted by —OH;

A is a divalent linking group selected from $C_2$-$C_8$ alkylene, $C_5$-$C_{10}$ cycloalkylene, $C_6$-$C_{20}$ arylene, and $C_6$-$C_{20}$ arylene-$C_1$-$C_{10}$ alkylene;

each of p, q, and r is independently an integer from 0 to 10; and n is 1 or 2.

In the method for manufacturing the copper foil of the present invention, the amount of the additive in the electrolytic solution depends on the specific additive selected, the concentration of copper ion and the concentration of sulfuric acid in the electrolytic solution, and the current density applied.

Since the mass production operations of copper foils generally keeps recycling the electrolytic solution by replenishing needed ingredients (e.g., copper ion, sulfuric acid, chloride ion, etc.), then filtered through filter materials to remove impurities and degraded additive(s) prior to pumping into the electrolytic cell. When the total content of the additive(s) is 75 ppm or less (relative to the total weight of the electrolytic solution), it is beneficial to reduce the usage of the filter materials such as activated carbon. Therefore, the method for manufacturing the ultrathin copper foil of the present invention is beneficial for mass production and environmental protection.

In one embodiment of the present invention, the content of the additive in the electrolytic solution is about 0.01 ppm to about 75.0 ppm, or about 0.5 ppm to about 50.0 ppm, or about 1 ppm to about 25.0 ppm.

The method for manufacturing the ultrathin copper foil of the present invention can be operated at a wide range of temperature of the electrolytic solution. The temperature of the electrolytic solution is usually between about 20° C. and about 80° C., preferably between about 30° C. and about 60° C.

The method for manufacturing the ultrathin copper foil of the present invention can also be operated by applying a wide range of electric current. The electrodeposition can be performed at a current density ranging from about 20 A/$dm^2$ to about 80 A/$dm^2$. When the electrodeposition is performed at a current density of higher than 60 A/$dm^2$, the production rate of the ultrathin copper foil may reach approximately at least 0.25 μm per second, which meets the standard of industrial high-speed production.

Generally, a copper foil manufactured by electrodeposition is an electrodeposited (ED) copper foils, that has a matte surface (deposit surface) and a shiny surface (drum surface). The ultrathin copper foil manufactured by the present method may be categorized as an ED copper foil.

Since the present ultrathin copper foil manufactured by the above method has high tensile strength and loop stiffness, it can withstand the conventional surface treatment process for copper foil without creasing and/or breaking. The third aspect of the present invention is to provide a surface-treated ultrathin copper foil that is manufactured by subjecting the present ultrathin copper foil without a carrier to a surface treatment process.

As mentioned previously, the conventional surface treatment process includes but not limited to the following steps: pickling, roughening, forming a heat-resistant layer, an antioxidation layer, and/or an adhesion promotion layer. The surface treatment steps described above may be applied to the matte surface, the shiny surface, or both surfaces of the ultrathin copper foil.

The method for manufacturing a surface-treated ultrathin copper foil without a carrier, comprising the following steps:

v-1) pickling both surfaces of the present ultrathin copper foil;

v-2) optionally roughening by forming copper nodules on at least one surface of the ultrathin copper foil;

v-3) optionally forming a heat-resistant layer on at least one surface of the ultrathin copper foil;

v-4) optionally forming an antioxidation layer on at least one surface of the ultrathin copper foil; or v-5) optionally forming an adhesion promotion layer on at least one surface of the ultrathin copper foil; and v-6) drying the ultrathin copper foil to obtain a surface-treated ultrathin copper foil without a carrier; wherein the ultrathin copper foil has been subjected at least two steps selected from v-2) to v-5);

the roughening step of v-2) is forming copper nodules on at least one surface of the ultrathin copper foil, and the copper nodules comprise Cu, Ni, Co, Mo, W, As, or a combination thereof;

the heat-resistant layer comprises Ni, Co, Mo, Zn, or a combination thereof;

the antioxidation layer comprises Cr, Zn, or a combination thereof; and the adhesion promotion layer comprises an adhesion promoter.

Generally, the first step of the surface treatment process is v-1) pickling both surfaces of the present ultrathin copper foil in a tank 11. The pickling is done by immerging the ultrathin copper foil in a solution that contains about 5%~10% of sulfuric acid or cupric sulfate to remove the oxide layer or grease on the raw copper foil.

The second step the surface treatment process is usually v-2) a roughening step. It is optional step depending on the end-use of the surface-treated ultrathin copper foil. The roughening step is done by forming copper nodules on at least one surface of the ultrathin copper foil by electroplating. As shown in FIG. 1, the surface of the ultrathin copper foil facing the positive electrode plates will form copper nodules in a plating bath 12. Suitable electrolytic solution for copper nodule formation may contain copper sulfate and other trace metal ions selected from Ni, Co, Mo, W, As, and a combination thereof. One skilled in the art can perform the step according to common knowledge without further elaboration herein.

The heat-resistant layer forming step v-3) of the surface treatment process is also optional depending on the end-use of the surface-treated ultrathin copper foil. To form a heat-resistant layer may be done by electroplating in an electrolytic solution containing Ni, Co, Mo, Zn, or combinations thereof. As shown in FIG. 1, the surface of the ultrathin copper foil having copper nodules and facing toward the positive electrode plates, thus, a heat-resistant layer is formed on top the copper nodules in a plating bath 13. The heat-resistant layer comprises Ni, Co, Mo, Zn, or a combination thereof.

The antioxidation layer forming step v-4) of the surface treatment process is also optional depending on the end-use of the surface-treated ultrathin copper foil. To form an antioxidation layer may be done by electroplating in an electrolytic solution containing Cr, Zn, or combinations thereof. As shown in FIG. 1, two of the positive electrode plates are placed to face both surfaces of the ultrathin copper foil in a plating bath 14. As a result, both surfaces of the ultrathin copper foil contain an antioxidation layer comprising Cr, Zn, or combinations thereof.

The adhesion promotion layer forming step v-5) of the surface treatment process is also optional depending on the end-use of the surface-treated ultrathin copper foil. If an adhesion promotion layer is desired, then it's usually conducted before the drying step. As shown in FIG. 1, the adhesion promotion layer is formed by coating a solution containing a adhesion promoter on the surface of the ultrathin copper foil facing the spray nozzles in a treatment chamber 15.

Known adhesion promoters (also named as coupling agent) for treating a copper surface include silanes and silyl amines disclosed in U.S. Pat. No. 5,861,076 to Adlam et al and U.S. Pat. No. 88,815,387 to Sato et al; azole silanes disclosed in U.S. Pat. No. 9,688,704 to Miura et al; amino triazine based compounds in U.S. Pat. No. 10,385,076 to Mori et al; and a number of references cited therein.

In one embodiment, the adhesion promoter for use in the surface treatment is a silane-based agent.

As the last step of a surface treatment process, v-6) drying the ultrathin copper foil to remove moisture and volatile substances is usually done by heating in an oven (as shown in FIG. 1) at a temperature of about 100° C. to about 200° C. for a duration of 1~10 seconds.

The third aspect of the present invention is to provide a surface-treated ultrathin copper foil without a carrier that is manufactured by the surface treatment method described previously. Depending on the specific end-use, the surface-treated ultrathin copper foil may comprise at least two treated layers selected form a copper nodule layer, a heat-resistant layer, an antioxidation layer, and an adhesion promotion layer, wherein the treated layers may be situated on at least one surface of the surface-treated ultrathin copper foil.

Figure 2:
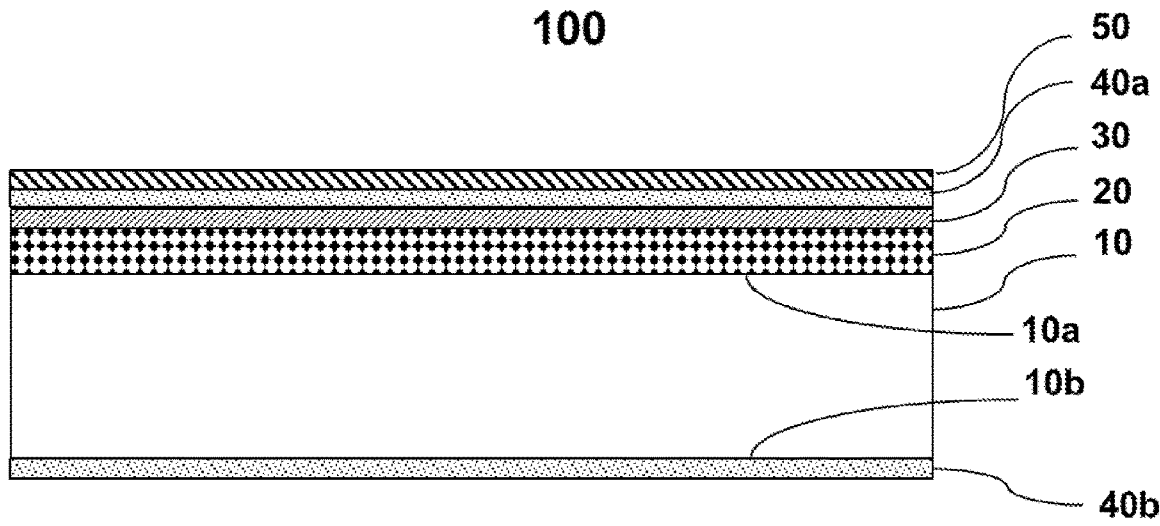
FIG. 2 shows an expanded view of a surface-treated ultrathin copper foil without a carrier according to one embodiment of the present invention.

FIG. 2 shows an expanded view of a surface-treated ultrathin copper foil without a carrier 100 according to one embodiment of the present invention. After subjecting an ultrathin copper foil without a carrier 10 of the present invention to the surface treatment process as described previously and illustrated in FIG. 1, a surface-treated ultrathin copper foil without a carrier 100 is provided. The surface-treated ultrathin copper foil without a carrier 100 comprises, in sequence of, a copper nodule layer 20, a heat-resistant layer 30, an antioxidant layer 40*a*, and an adhesion promotion layer 50 on one surface (10*a*) of the ultrathin copper foil without a carrier 10; and an antioxidant layer 40*b* on the other surface (10*b*) of the ultrathin copper foil without a carrier 10. Noted that the surface-treated copper foil without a carrier of the present invention is not limited to what is shown in FIG. 2 and can be adjusted based on the specific application requirements.

In one embodiment of the present invention, the surface-treated ultrathin copper foil without a carrier comprises at least two treated layers selected from a copper nodule layer, a heat-resistant layer, an antioxidation layer, and an adhesion promotion layer, wherein the treated layers are situated on at least one surface of the surface-treated ultrathin copper foil.

In one embodiment of the present invention, the surface-treated ultrathin copper foil without a carrier comprises at least three treated layers selected from a copper nodule layer, a heat-resistant layer, an antioxidation layer, and an adhesion promotion layer, wherein the treated layers are situated on at least one surface of the surface-treated ultrathin copper foil.

In one embodiment of the present invention, the surface-treated ultrathin copper foil without a carrier comprises, in sequence of: a copper nodule layer, a heat-resistant layer, an antioxidation layer, and an adhesion promotion layer, wherein the treated layers are situated on at least one surface of the surface-treated ultrathin copper foil.

The fourth aspect of the present invention is to provide articles made by use of the ultrathin copper foils of the present invention. The articles can be negative current collectors of lithium-ion batteries and electric double-layer capacitors, resin coated coppers (RCCs), copper clad laminates (CCLs), flexible copper-clad laminates (FCCLs), rigid printed circuit boards, flexible printed circuit boards, or rigid-flex printed circuit boards.

Without further elaboration, it is believed that one skilled in the art using the preceding description can utilize the present invention to its fullest extent. The following examples are, therefore, to be construed as merely illustrative, and not limiting of the invention in any way whatsoever.

EXAMPLES

The abbreviation "E" stands for "Example", and "CE" stands for "Comparative Example". Each example was prepared in a similar manner, and the comparative examples were obtained from commercial sources. Performance tests of the examples and the comparative examples were carried out in the same or similar manner.

Materials

NCP-A: a nitrogen-containing cationic polymer, molecular weight (Mw) is about 9000, manufactured by DuPont Electronics, Inc. Wilmington, DE, USA, under the trade name of MICROFILL™-EVF III. NCP-A is a reaction product of a diamine of formula (I) and an epoxide of formula (II) in a 1:1 molar ratio, wherein $R^1$, $R^2$, $R^3$, $R^4$, $R^5$ and $R^6$ are hydrogen; p, q, and r is 0, A is $C_6$ alkylene; and $R^7$ is a $C_4$ alkylene.

Copper sulfate, sulfuric acid, hydrochloric acid, and compounds with unidentified commercial source were purchased from Sigma-Aldrich Company.

The copper foil of CE1 had a carrier copper foil of 18 μm in thickness and was purchased from Mitsui Mining & Smelting Co. Ltd. The copper foil of CE1 had been surface-treated by a conventional surface treatment process.

The copper foil of CE2 was purchased from Chang Chun Petrochemical Co. The copper foil was electroplated with an antioxidant layer right after electrodepositing and didn't undergo a conventional surface treatment process.

The copper foil of CE3 was purchased from Furukawa Electric Co. Ltd., which had no carrier, but had been surface-treated by a conventional surface treatment process.

Preparation of Copper Foils of Examples 1-2

After thoroughly mixing the electrolytic solution based on the amounts of copper sulfate, sulfuric acid, chloride ions, and additive listed in Table 1, the ultrathin copper foils of Examples 1-2 were prepared by the following steps.

First, a titanium drum was used as the negative electrode (cathode), and a dimensional stable anode ($IrO_2$/Ti) was used as positive electrode. A DC power supply was used. The space between the negative electrode and the anode was filled with the electrolytic solution, and the temperature of the electrolytic solution was maintained at 40° C. A copper foil with a thickness of about 3-5 μm was directly formed on the surface of the titanium drum following the preparation parameters in Table 1. After the electrodepositing process, the copper foil was removed from the titanium drum, and an ultrathin copper foil was obtained, i.e., an embodiment of the present invention.

TABLE 1

| # | Copper Sulfate (g/L) | Sulfuric Acid (g/L) | Chloride ion (ppm) | Additive (ppm) | Current Density ($A/dm^2$) | Electrolytic solution Temp. (° C.) | Plating duration (Second) |
|---|---|---|---|---|---|---|---|
| E1 | 260 | 80 | 3 | NCP-A (3) | 60 | 40 | 14 |
| E2 | 260 | 80 | 3 | NCP-A (3) | 60 | 40 | 23 |

Testing Methods

The copper foils of Examples 1-2 and Comparative Examples 1-3 were tested by the following methods when applicable.

1. Area Weight

A piece of each copper foil of Examples 1-2 and Comparative Examples 1-3 was cut into a square of 10 cm×10 cm. For the copper foil sample of CE1, the carrier copper foil was peeled off before weighing. The square sample of each copper foil was weighed by using an electronic scale to calculate the area weight in grams/square meter ($g/m^2$) and recorded in Table.2.

2. Nominal Thickness

Referring to the method of IPC-TM-650 2.2.12, the thickness (μm) of each copper foil sample was calculated by dividing the respective area weight by the density of copper (i.e., 8.94 $g/cm^3$).

3. Tensile Strength and Elongation Test

Test specimens of each copper foil were prepared and tested according to the methods of IPC-TM-650 2.4.18B. The test specimens of each copper foil sample were tested at ambient temperature (i.e., about 20-25° C.) for the tensile strength and elongation.

4. Loop Stiffness

Each copper foil sample was cut into strips with a width of 25.4 mm. Loop stiffness was measured by using a loop stiffness tester produced by Toyo Seiki Seisaku-sho, Ltd. under the test conditions of a loop length of 60 mm, and a compression rate at 3.3 mm/second.

5. Tolerance of Surface Treatment

The copper foil samples of E1-2 and CE2 were each independently subjected to the following surface treatment process to evaluate the tolerance. The surface treatment process included the following steps, in sequence of, 1) pickling, 2) roughening, 3) forming a heat-resistant layer, 4) forming an antioxidation layer, 5) forming an adhesion promotion layer with a silane-based agent, and 6) drying (see FIG. 1).

After the multiple steps of surface treatment, "Fail" was marked for a copper foil sample that was broken at any step of surface treatment, and "Pass" was marked for copper foil sample undergone the multiple steps of surface treatment without breakage or wrinkle.

The test results of each copper foil sample (Examples 1-2 and Comparative Examples 1-3) are listed in the following Table 2.

TABLE 2

| | E1 | E2 | CE1[(a)] | CE2 | CE3 |
|---|---|---|---|---|---|
| Area Weight ($g/m^2$) | 28.9 | 44.3 | 30.01 | 31.38 | 53.69 |
| Nominal Thickness (μm) | 3.24 | 4.96 | 3.36 | 3.49 | 6.01 |
| Tensile Strength ($Kgf/mm^2$) | 52.3 | 56.3 | NA | 32.1 | 31.0 |
| Elongation (%) | 1.21 | 1.36 | NA | 1.48 | 2.63 |
| Loop Stiffness (mN) | 2.93 | 5.01 | NA | 1.47 | 6.87 |
| Having Carrier | N | N | Y | N | N |
| Surface-treatment Step | | | | | |
| 1. picking | Y | Y | — | Y | — |
| 2. roughening | Y | Y | — | Y | — |
| 3. forming a heat-resistant layer | Y | Y | — | Y | — |
| 4. forming an antioxidant layer | Y | Y | — | Y | — |
| 5. forming an adhesion promotion layer | Y | Y | — | Y | — |
| 6. drying | Y | Y | — | Y | — |
| Overall surface-treatment tolerance | Pass | Pass | Pass[(b)] | Fail | Pass[(b)] |

[(a)]Because the cooper foil of CE1 has a carrier, the mechanical properties of the sample were not measured and shown as "NA".
[(b)]The commercial copper foils of CE1 and CE3 have been surface-treated previously, they were recorded as "Pass" without subjecting to additional surface treatment process.

As shown in Table 2, the present ultrathin copper foils of Example 1-2 have good mechanical properties and held intact after the surface treatment process.

The copper foil of Comparative Example 1 has an ultra-thin thickness and multiple treated layers, but it constitutes a carrier (i.e., a copper foil of 18 μm) that requires a removal step when using it in a PCB manufacturing process.

The copper foil of Comparative Example 2 has a thickness similar to that of the ultrathin copper foil of Example 1 and without a carrier, yet the tensile strength and loop stiffness of the copper foil of CE2 are insufficient, which make it failed the surface treatment tolerance test. In fact, the breakages of the copper foil samples of CE2 occurred randomly in multiple steps of the surface treatment process, but most often occurred in the roughening step.

The copper foil of Comparative Example 3 has a nominal thickness more than 5.0 μm, a tensile strength less than 40 $Kgf/mm^2$, and a loop stiffness of 6.87 mN. Since the copper foil of Comparative Example 3 also has multiple treated layers, one may attribute the copper foil of CE3 passed the surface treatment process is due to its high loop stiffness.

While specific embodiments of the invention have been shown and described, further modifications and improvements will occur to those skilled in the art. It is desired that it be understood, therefore, that the invention is not limited to the particular form shown and it is intended in the appended claims which follow to cover all modifications which do not depart from the spirit and scope of the invention.

What is claimed is:

1. An ultrathin copper foil without a carrier, characterized in that:
- the ultrathin copper foil has an area weight of 45 $g/m^2$ or less;
- a nominal thickness of 5.0 μm or less;
- a tensile strength of 40 $Kgf/mm^2$ or more; and
- a loop stiffness of 2 mN or more.

2. The ultrathin copper foil of claim 1, characterized in that the ultrathin copper foil has no breakage after undergoing a surface treatment process.

3. The ultrathin copper foil of claim 2, wherein the surface treatment process includes a pickling step, a roughening step, a heat-resistant layer forming step, an antioxidant layer forming step, an adhesion promotion layer forming step, or a combination thereof.

4. The ultrathin copper foil of claim 1, wherein the ultrathin cooper foil is used for current collectors, flexible printed circuit boards, rigid printed circuit boards, rigid-flex printed circuit boards, or resin coated copper (RCC).

5. A surface-treated ultrathin copper foil without a carrier, that is manufactured by the following steps:
- v-1) pickling both surfaces of the ultrathin copper foil of claim 1;
- v-2) optionally roughening at least one surface of the ultrathin copper foil, wherein roughening comprises forming copper nodules on at least one surface of the ultrathin copper foil, and wherein the copper nodules comprise Cu, Ni, Co, Mo, W, As, or a combination thereof;
- v-3) optionally forming a heat-resistant layer comprising Ni, Co, Mo, Zn, or a combination thereof on at least one surface of the ultrathin copper foil;
- v-4) optionally forming an antioxidation layer comprising Cr, Zn, or a combination thereof on at least one surface of the ultrathin copper foil;
- v-5) optionally forming an adhesion promotion layer comprising an adhesion promoter on at least one surface of the ultrathin copper foil; and
- v-6) drying the ultrathin copper foil to obtain a surface-treated ultrathin copper foil without a carrier, wherein the ultrathin copper foil has been subjected to at least two of the optional steps selected from v-2) to v-5).

6. The surface-treated ultrathin copper foil without a carrier of claim 5, wherein the ultrathin cooper foil is used for current collectors, flexible printed circuit boards, rigid printed circuit boards, rigid-flex printed circuit boards, or resin coated copper (RCC).

7. An article, that is made by incorporating the surface-treated ultrathin copper foil without a carrier of claim 5.

8. The article of claim 7, wherein the article is a negative current collector of a lithium-ion battery or an electric double-layer capacitor, a copper clad laminate, a rigid printed circuit board, a flexible printed circuit board, a rigid-flex printed circuit boards, or a resin coated copper.

9. The surface-treated ultrathin copper foil without a carrier of claim 5, wherein the adhesion promoter is a silane-based agent.

* * * * *